Oct. 23, 1934.                 O. ROBINSON                    1,977,895
                        FRONT WHEEL BRAKE CONTROL
                            Filed June 15, 1932
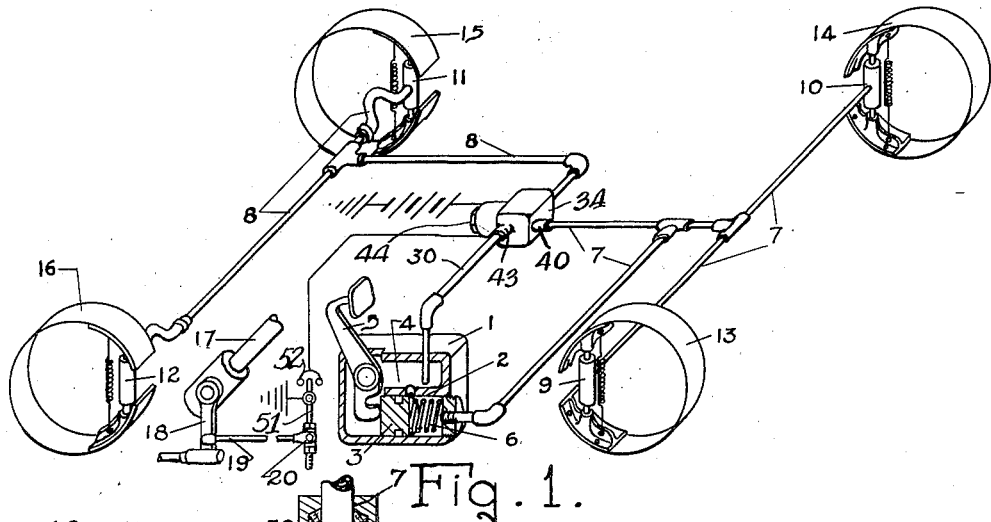
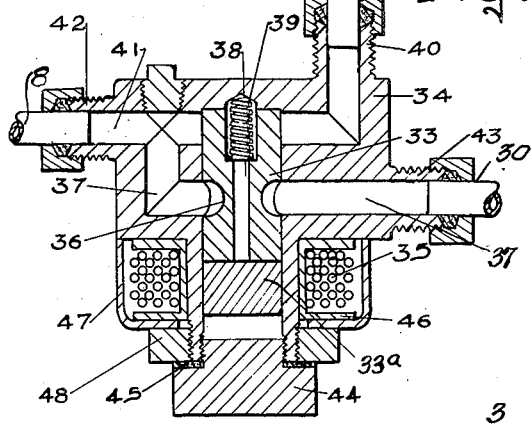
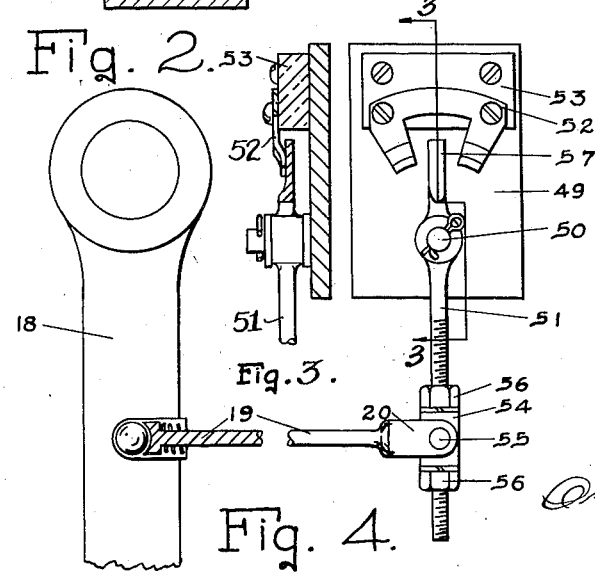
INVENTOR.
Oscar Robinson

UNITED STATES PATENT OFFICE 1,977,895

FRONT WHEEL BRAKE CONTROL

Oscar Robinson, Detroit, Mich.

Application June 15, 1932, Serial No. 617,275

1 Claim. (Cl. 188—152)

This invention pertains to automatic front wheel brake control devices for automobiles.

It is well known that with most modern four wheel brakes it is readily possible to apply the brakes so effectively as to slide all four wheels. When an operator is required to suddenly bring his car to a stop he fully applies his brakes and thus locks all four wheels and the momentum carries the car forward. When the steering wheels of a car are locked they offer very nearly the same resistance to motion in any direction they happen to be moving and consequently turning these wheels about the king pin at an angle to the straight ahead position, has no different effect than if the wheels were left in the first position. Consequently the car is not steerable. In order to provide steering ability, it is necessary that the steering wheels be allowed to turn about their axles thereby offering less resistance in one direction than in others; which force is used to change the direction of the motion of the car.

It is an object of this invention to provide means operated by the steering mechanism for releasing the steering wheel brakes when said wheels have been inclined about the king pin from the straight ahead position by a predetermined amount, thereby allowing these wheels to operate in the normal manner and the car becomes steerable.

Figure 1 is a diagrammatic view of the apparatus applied to hydraulic type brakes.

Figure 2 is a section through a magnetically controlled type of valve, the valve core being shown in the position it occupies when the front brakes are relieved of pressure.

Figure 3 is a section on line 3—3 of Figure 4.

Figure 4 is an enlarged elevation partly in section of the switch used to provide the electric contact.

The assembly shown at Figure 1, comprises the brake energizing mechanism and steering controlled cut off mechanism.

The brake energizing mechanism is not different from those now in common use. The energizing device 1 has a cylinder 2, a piston 3, a liquid reservoir 4, pedal 5, adapted to move piston into cylinder, spring 6 adapted to return piston and pedal back to the normal position, pipe lines 7 and 8 for conducting the liquid to the cylinders 9, 10, 11, and 12, where the liquid pressure acting on pistons in said cylinders expands the bands 13, 14, 15, and 16.

The steering wheel brake releasing mechanism here shows a steering column 17 having an arm 18 onto which one end of link 19 is hinged. The other end of link 19 carries a yoke 20 which is connected to and operates the valve mechanism that cuts off the pressure supply to the brakes 15 and 16 on the steering wheels.

The electrically operated valve is shown in Figures 1 and 2. It consists of a brass valve core 33, having on its lower end an iron core portion 33a, a casing 34, and a solenoid 35. The core has a loose sliding fit in a valve chamber 35a bored in the casing and it has a deep annular groove 36 turned on its cylindrical surface registering with the relief passage 37. The valve core also has a hole 38 drilled through its entire length to equalize the pressure at both ends, and a larger hole adapted to accommodate spring 39 in the valve end of the core. The casing 34 is made of non magnetic material and has a passage 41 which passes through boss 40 and the valve chamber on to the brake outlet boss 42. Passage 37 meets the passage 41 on the brake boss side of the valve chamber and passes back through the valve chamber to the relief boss 43. The valve chamber is closed by a brass plug 44 screwed into the open end. A gasket 45 between the plug and chamber prevents the loss of liquid at this joint. The solenoid 35 is mounted around an end of the valve chamber 35a. It is wound in a spool 46 which is held in place by cover 47 and nut 48 screwed onto the valve chamber 43.

In operation, normally the spring 39 holds the valve against the plug 44, and the passage 41 from the boss 40 is open through to boss 42. At the same time the relief passage 37 is closed by the valve 33. The boss 40 is connected through pipes 7 to cylinder 2 and the boss 42 to the steering wheel brake cylinders 11 and 12 through pipes 8. Therefore when the operator presses on the brake pedal the liquid is forced out into the pipe lines 7 through passage 41 of the valve to the pipe line 8 to the front wheel brakes, thereby applying the brakes. Now if an electric current of sufficient strength is passed through the solenoid 35 it becomes energized and forces the iron core of the valve out to the other end of the valve chamber compressing the spring 39, and closing the passage 41, and at the same time opening the passage 37 through the annular groove 36 around the valve body 33. The liquid from the brake cylinders 11 and 12 can then flow back to the reservoir 4, thus releasing the steering wheel brakes.

The switch that is here shown to open and close the electric circuit consists of a base 49 having a stud 50 about which is fulcrumed a rod 51.

Rod 51 is threaded on its lower end and carries on its upper end the point for contacting the contact plate 52 which plate is insulated from the base by the insulating material 53. On the screw end of the rod 51 is mounted a bushing 54 carrying studs 55; each of which engages in an eye of yoke 20 of the operating link 19. On either end of the bushing 54 is a nut 56 adapted to set the position of the bushing with regard to the fulcrum stud 50. The contactor 57, carried at the other end of the member 51, contacts with plate 52. The nuts 56 provide a quick and convenient method of lengthening or shortening the radius and consequently the arc through which the yoke 20 must travel before contact can be made; thereby adjustability of the point at which the steering brakes are released is obtained.

The operation of the switch is controlled by the link 19 which is hinged to the steering arm 18, a movement of which produces a corresponding movement of the switch rod 51. However the angle through which this rod moves is within limits adjustable independent of the length of motion imparted by the arm 18, as before shown. Electrically the contact plate 52 is insulated from the frame and the rod 50 is not, so when the two make contact the circuit through the switch is completed.

The electrical circuit involved, starts at the ground, to the rod 51 then when the switch is closed to the plate 52, then through wire to the solenoid 35 and out to one side of the battery and the other side of which battery being grounded.

I claim.

In a motor vehicle, a pair of steering wheels and a pair of driving wheels, a steering mechanism, brakes for said steering wheels and for said driving wheels, fluid pressure means for energizing said brakes and connected to the separate pairs of wheels through two separate conduits, an electrically operated solenoid type valve for cutting off the pressure in the conduit that goes to the steering wheels, and means operated by a movement of the steering mechanism to cause a steering movement of the steering wheels, in either direction beyond a predetermined amount, to operate the valve electrically and cut off the fluid pressure from the steering wheel brakes.

OSCAR ROBINSON.